Figure 1:
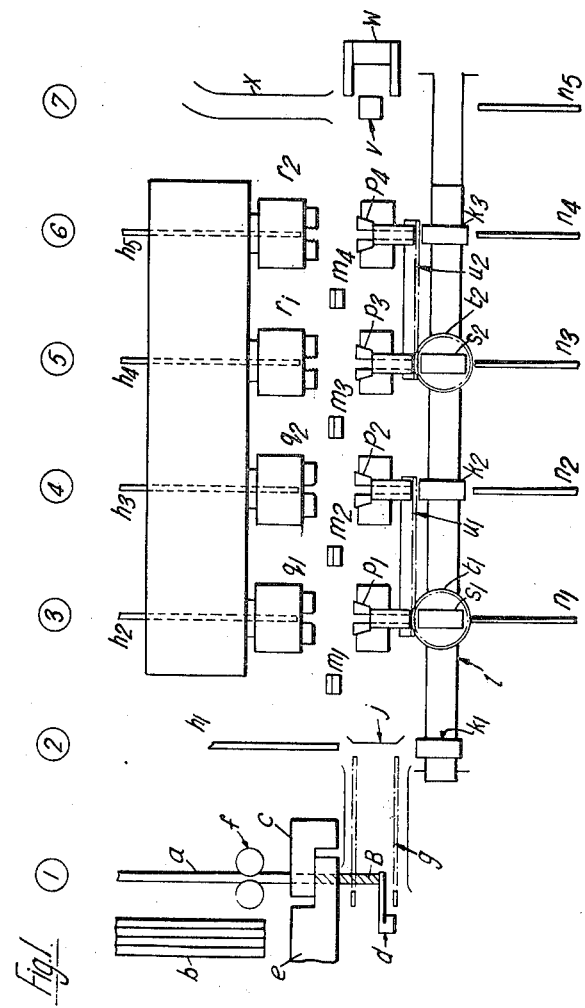

April 27, 1965 R. GRUNDY 3,179,964

AUTOMATIC STUD PRODUCING MACHINE

Filed July 17, 1963 8 Sheets-Sheet 1

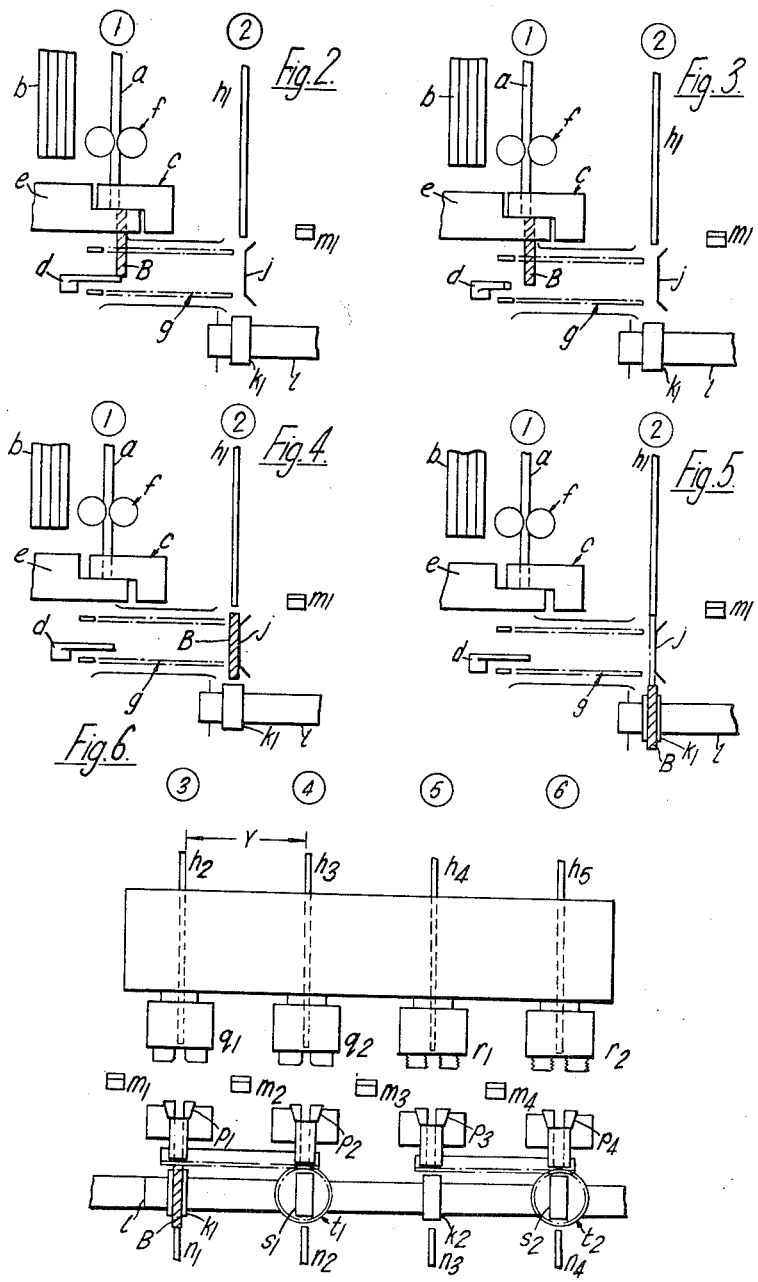

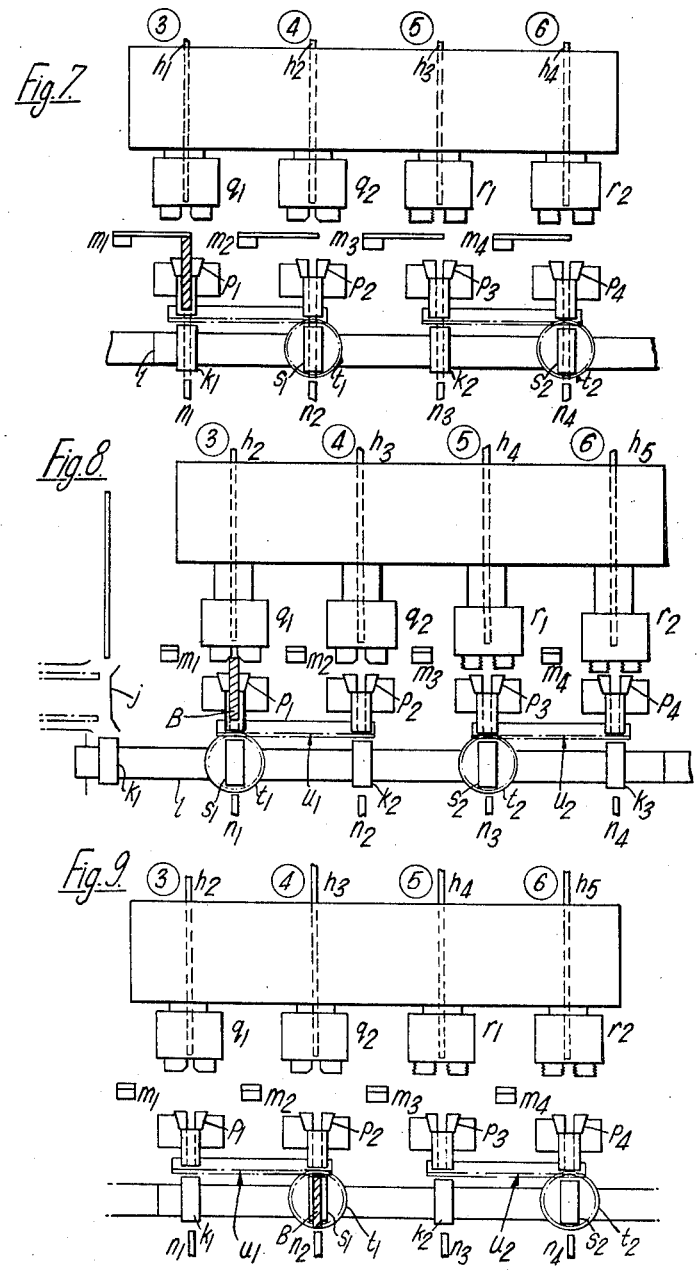

April 27, 1965    R. GRUNDY    3,179,964
AUTOMATIC STUD PRODUCING MACHINE
Filed July 17, 1963    8 Sheets-Sheet 4
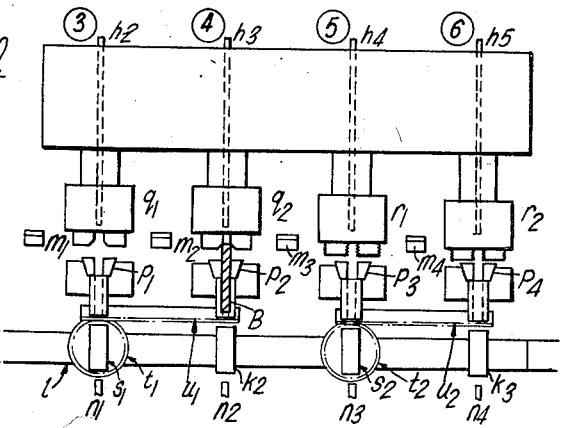
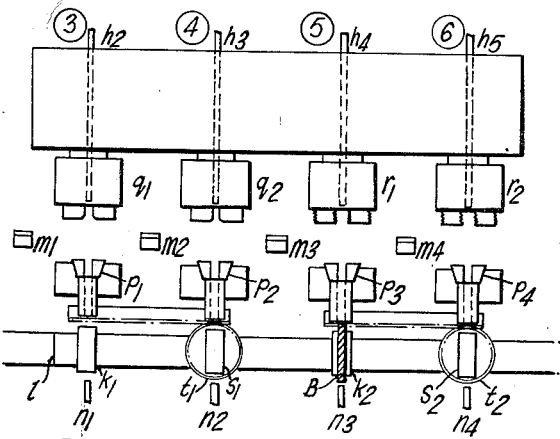
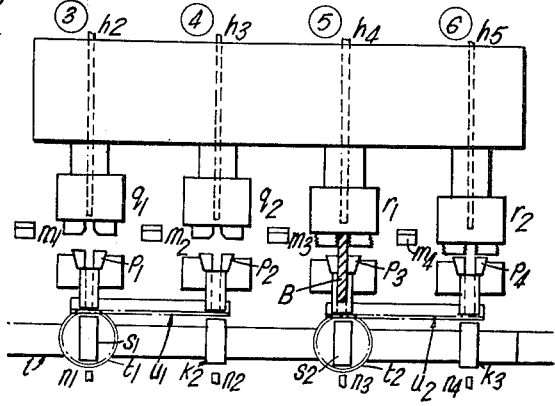

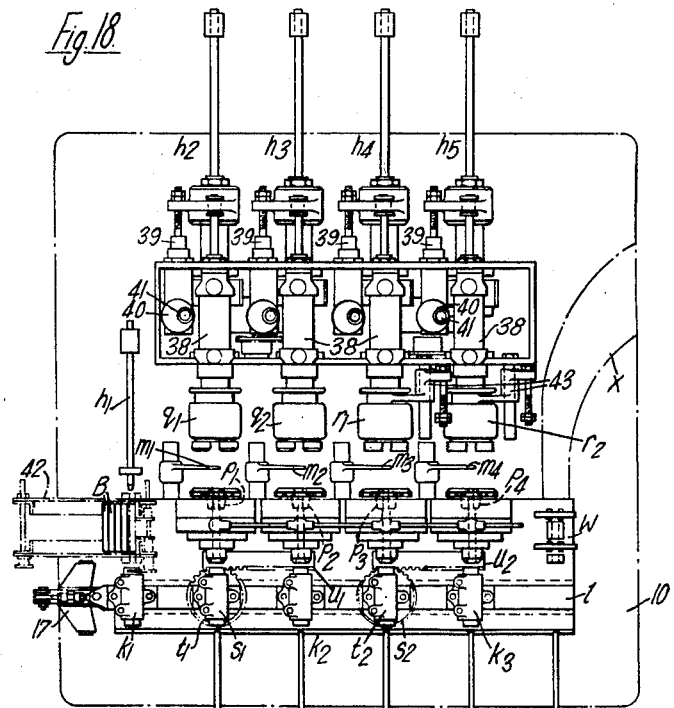
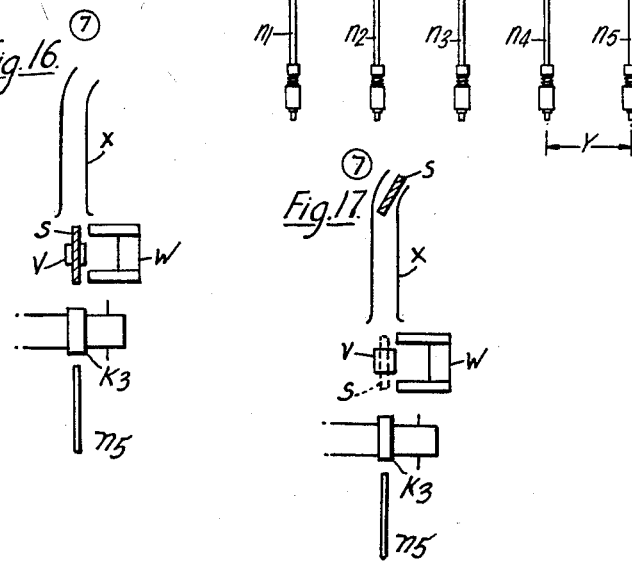

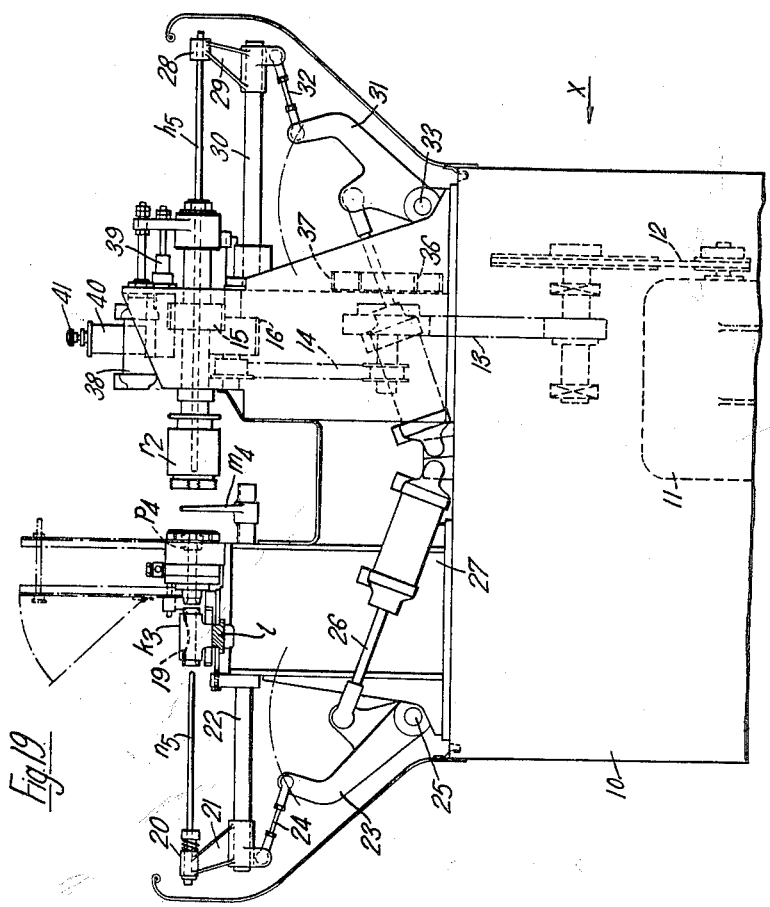

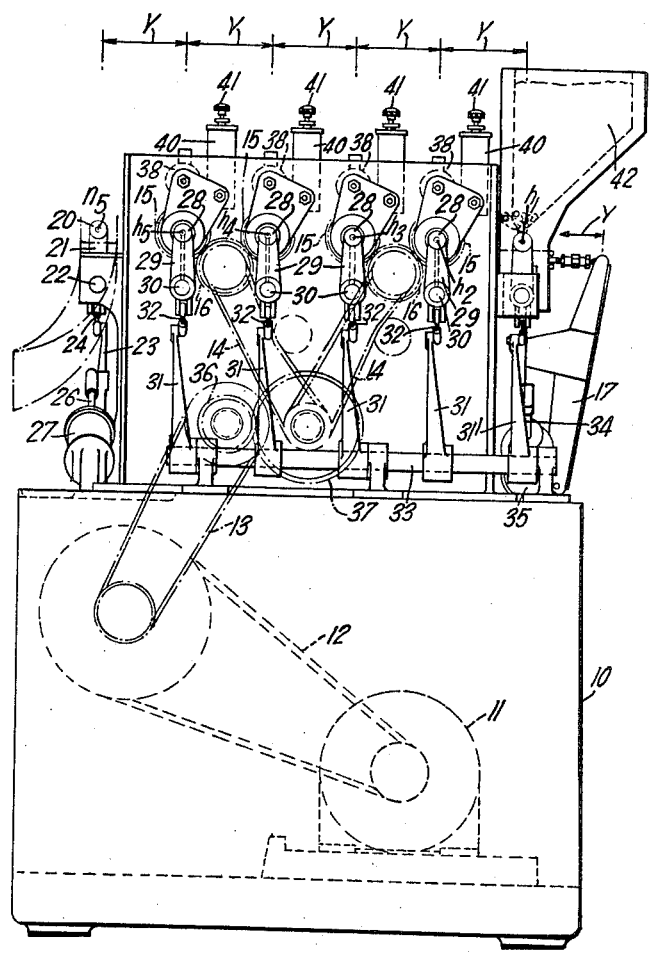

3,179,964
AUTOMATIC STUD PRODUCING MACHINE
Richard Grundy, Kirby Muxloe, England, assignor to Reid & Sigrist Limited, Braunstone, England, a British company
Filed July 17, 1963, Ser. No. 295,643
Claims priority, application Great Britain, July 20, 1962, 27,921/62
7 Claims. (Cl. 10—2)

This invention relates to a machine for automatically producing, in a progressive sequence of operations, studs of the character each consisting of a relatively short length of round bar of any suitable material which is formed at each of its opposite ends with any appropriate formation.

The invention is concerned more especially, and without any limitation in this respect, with the production of studs of the particular kind each consisting of such a short length of round bar which is formed at each of its opposite ends with a screwthread.

Studs of this particular kind naturally vary in diameter and length, and the axial extent of the screwthreads cut or rolled at opposite ends of the studs also vary, according to the purpose for which the studs are required. Whilst the improved machine constituting this invention is capable of producing studs of various dimensions, within prescribed limits, it may be mentioned again without limitation in this respect, that a particular machine contemplated will produce studs of any diameter between, say, $5/16''$ and $5/8''$ and of any desired length between approximately $1\frac{1}{2}''$ and $4\frac{1}{2}''$.

The object of the invention is to provide a generally improved automatic stud producing machine which, besides being of simple construction, relatively inexpensive to manufacture and efficient in operation, embodies novel means for progressively transferring stud blanks from station to station between successive operations on the blanks, as will be hereinafter described.

Broadly considered, the stud producing machine provided by this invention comprises, in combination, a plurality of work heads located at successive stations arranged in a straight line, said work heads being disposed in pairs each of which pairs is adapted to appropriately form opposite ends of successively fed stud blanks, collets at said stations for securely holding stud blanks while they are being operated upon by the heads, a transfer component which is linearly movable to and fro parallel to the aforesaid line in front of the work heads and is furnished with receivers for receiving and carrying the stud blanks during progressive transfer of the same from station to station and for turning relevant blanks end for end during each transfer so as to present alternately opposite ends thereof to the appropriate work heads, and sets of elements arranged at respectively opposite sides of the path of movement of the transfer component, the elements of one set being operable to eject blanks from the collets into the receivers whilst the elements of the other set are operable to return the blanks from such receivers into the collets.

The operative phases and controlled axial movements of the work heads, the to and fro linear movements of the transfer component, the opening and closing of the collets, and movements of the two sets of elements, alternately, for ejecting the stud blanks from the collets into the receivers, and vice versa, are all timed by or from a cycle timer of any suitable character, the arrangement being such that each of the stud blanks successively fed into the machine from the supply is intermittently and progressively advanced through the succeeding stations until it is finally ejected in its finished condition from the last receiver on the transfer component.

Without any limitation in this respect, it will be assumed for the sake of convenience in the following further description that there are four work heads, arranged in two succeeding pairs, the two successive heads of the first pair being adapted to profile, run down or/and chamfer the respectively opposite ends of each of the successively fed stud blanks, whilst the heads of the second pair are adapted to screw the opposite ends of each such blank to produce a screwthreaded stud of the particular kind referred to.

Figure 13:
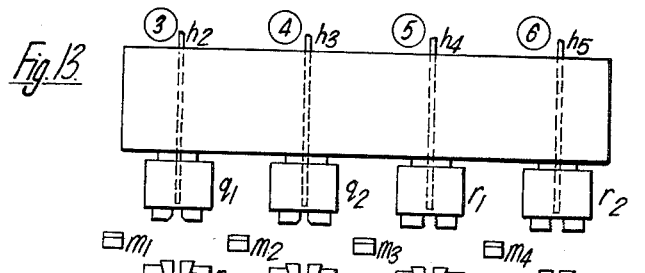
Figure 14:
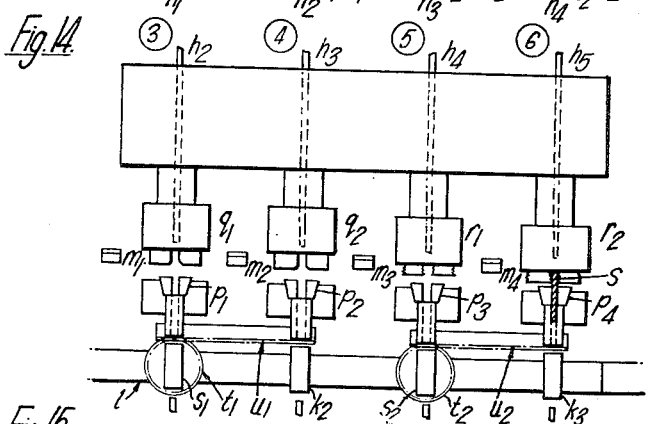
Figure 15:
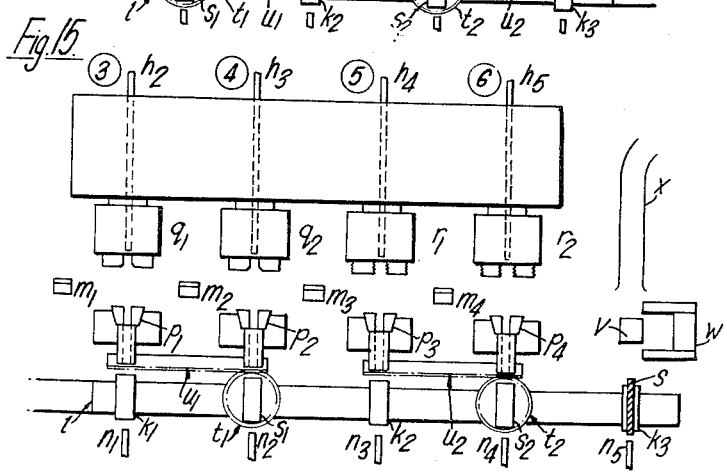

In order that the invention may be more clearly understood and readily carried into practical effect, one specific form of a multi-spindle automatic stud producing machine constructed in accordance therewith and the manner in which it operates will now be described with reference to the accompanying drawings, wherein, FIGURE 1 is a diagrammatic plan view illustrating the general layout, in the said machine, of the line of work heads, the collets, the transfer slide and its receivers, the ejectors, the supply magazine and associated mechanism for cropping bars and feeding stud blanks successively into the machine and the delivery chute for finished studs ejected from the machine, FIGURES 2, 3, 4 and 5 are four detail plan views (each similar to the left-hand portion of FIGURE 1) showing the manner in which a stud blank is cropped from a bar and actually fed into the machine, FIGURES 6–14 constitute a series of nine detail plan views (each similar to the central portion of FIGURE 1) depicting successive operational stages of a stud-producing cycle, FIGURE 15 is a further plan view depicting the next stage to that shown in FIGURE 14, FIGURES 16 and 17 are two detail plan views (each similar to the right-hand portion of each of FIGURES 1 and 15) illustrating the manner in which a finished stud is ejected and delivered from the machine, FIGURE 18 is a complete and more developed plan view of a practical form of the machine, FIGURE 19 is a side elevation of the same, and FIGURE 20 is a rear view of the said machine as seen in the direction of the arrow X in FIGURE 19.

Like parts are designated by similar reference characters throughout the drawings.

Referring to FIGURE 1, it will be seen that the four work heads are arranged in two succeeding pairs. The two successive heads of the first pair are chamfer heads which are located at fixed stations 3 and 4 and are designated $q_1$ and $q_2$ respectively. The two heads of the second pair, on the other hand, are screwing heads which are located at fixed stations 5 and 6 and are respectively designated $r_1$ and $r_2$. For use in conjunction with these work heads there is a set of four collets $p_1$, $p_2$, $p_3$ and $p_4$, viz. one in front of and in co-axial alignment with each of the work heads. Thus, these four collets are respectively located at the four fixed stations 3, 4, 5 and 6 which are essentially spaced at equal distances apart. The illustrated machine includes a transfer slide $l$ which is reciprocable to and fro in front of and parallel to the line of work heads. The stud blank receivers provided on the transfer slide $l$ are designated (in order from left to right) $k_1$, $s_1$, $k_2$, $s_2$ and $k_3$ and they are essentially spaced apart uniformly at the same pitch as the work heads and the collets.

The two receivers $s_1$ and $s_2$ are associated with means, operable as a consequence of linear movements of the transfer slide $l$, for turning each of such receivers through exactly 180° so as to turn a stud blank carried by the receiver end for end. In this way, a stud blank, after having one end thereof operated upon by a work head at one station, can be readily turned through 180°, i.e. end for end, to present its opposite end to another work head at the next station.

The receiver $k_1$ is fixed upon the slide $l$ and is located at the leading end of the series of receivers to receive, after each complete to and fro movement, i.e. reciprocation, of the transfer slide, a fresh stud blank B from the supply. At the other end of the series of receivers, the receiver $k_3$ is also fixed upon the transfer slide $l$ and is adapted to receive a finished stud prior to final ejection of the latter from the machine. The receiver $k_2$, also fixed upon the slide $l$ is located between the two turnable receivers $s_1$ and $s_2$. The two last mentioned receivers are mounted upon the tops of and rotate together with toothed pinions $t_1$ and $t_2$ which are arranged to turn about axes on the transfer slide $l$ and have their teeth permanently in mesh with straight toothed racks $u_1$ and $u_2$ provided at fixed locations alongside the said slide. Thus, each time the slide $l$ is moved linearly a distance equal to the pitch of the work heads and collets to advance stud blanks carried in the receivers one step towards the finished stud ejector station at the right-hand side of FIGURE 1, each of the two pistons $t_1$ and $t_2$ and the receivers $s_1$ and $s_2$ they carry will be automatically turned through 180°. Conversely, the pinions $t_1$ and $t_2$ and associated receivers $s_1$ and $s_2$ will be automatically restored to their original positions each time the transfer slide $l$ is moved back idly to its starting position, with the receivers empty.

The sets of elements provided at opposite sides of the path of to and fro linear movement of the transfer slide $l$ may advantageously, and as shown, consist of relatively thin and straight reciprocatory ejector pins (hereinafter for convenience referred to simply as "ejectors") spaced at the same pitch as the work heads $q_1$, $q_2$, $r_1$ and $r_2$ and collets $p_1$, $p_2$, $p_3$ and $p_4$ and each of which extends at right angles to the slide. All of the ejectors in each set are simultaneously movable both in the forward direction and when being retracted.

There is a set of five ejectors at the side of the transfer slide at which the work heads are located, i.e. at the back of the machine, this set comprising four rear ejectors $h_2$, $h_3$, $h_4$ and $h_5$ each of which extends co-axially through a hollow spindle of one of the work heads, and an additional rear ejector $h_1$ for ejecting a stud blank from the supply into the fixed receiver $k_1$.

At the opposite side of the transfer slide $l$ to the work heads and the collets, that is to say at the front of the machine, there is a further set of five ejectors, $n_1$, $n_2$, $n_3$, $n_4$ and $n_5$, these front ejectors however, being displaced laterally one complete space with respect to the five rear ejectors $h_1$, $h_2$, $h_3$, $h_4$ and $h_5$. The set of front ejectors comprise four ejectors $n_1$, $n_2$, $n_3$ and $n_4$ which are co-axial with the rear ejectors $h_2$, $h_3$, $h_4$ and $h_5$ at fixed stations 3, 4, 5 and 6 respectively and an additional ejector $n_5$ for ejecting finished studs from the receiver $k_3$ at appropriate times.

If the screwing heads $r_1$ and $r_2$ are in the form of thread rolling heads, then the work heads $q_1$ and $q_2$ will be constructed and operable to run down, i.e. reduce in diameter, the opposite ends of the stud blanks. But, if, on the other hand, the screwing heads $r_1$ and $r_2$ are in the form of cutter heads operable to cut threads in the end portions of the stud blanks, the work heads $q_1$ and $q_2$ need only function to chamfer the ends of the said blanks.

The rear ejector $h_1$ may, if desired, serve simply to eject fresh stud blanks from the base of a suitable hopper, these blanks being produced by initially cutting and shearing round bar stock into appropriate lengths. In the particular arrangement illustrated in the drawings, however, there is a magazine $b$ from which an appropriate length (e.g. 10 to 12 feet) of round bar stock such as $a$ is periodically transferred by automatic means to an adjacent station 1. Preferably, the bars are stacked vertically in the magazine $b$ to save floor space although, for the sake of clarity in FIGURES 1-5, such magazine is depicted as being horizontally disposed. Each bar such as $a$ is, in turn, fed through the shear blades $c$ and $e$ of a bar cropper by feed rollers $f$, or any equivalent means, up to the swing stop $d$ at the station 1. The position of this stop is adjustable to determine the length of the stud blank B.

Each of the blanks successively cropped from a bar $a$ is processed through the succeeding stations 2, 3, 4, 5, 6 and 7 in the manner now to be described. For simplicity of description only the blank designated B will be referred to; that is to say, no reference will be made to the several other blanks which are at the same time being dealt with at the various stations.

In the following description, the first end of the stud blank B to be operated upon by either of the two successive pairs of work heads will be referred to as the "1st end" whilst the opposite end of the said blank will for convenience be referred to as the "2nd end."

The operational stages of the cycles necessary to process a blank right through the machine are as follows:

(i) The moving shear blade $e$ of the bar cropper first advances and crops the blank B from the round bar $a$ (see FIGURE 2), whereupon, as depicted in FIGURE 3, the stop $d$ swings clear.

(ii) The blank B is then ejected clear of the cropper, by a further advancement of the bar $a$ effected by the feed rollers $f$, on to a conveyor $g$ by means of which, as shown in FIGURE 4, the blank is conveyed laterally up to a stop plate $j$ at station 2. At this stage the swing stop $d$ is spring returned into its operative "stop" position.

(iii) All the rear ejectors $h_1$, $h_2$, $h_3$, $h_4$ and $h_5$, which are mechanically coupled together and arranged operate simultaneously, are next advanced towards the front of the machine, the ejector $h_1$, thus projecting the blank B from the stop plate $j$ into the first receiver $k_1$ rigidly fixed on the transfer slide $l$ as illustrated in FIGURE 5. The said blank is prevented from passing completely through the receiver $k_1$ by means of a friction spring incorporated within the latter. It is convenient to mention here that all the remaining receivers $k_2$, $k_3$, $s_1$ and $s_2$ are similarly provided with a friction spring. A limit switch or a pilot valve is contacted by the ejector mechanism which at the terminating phase of this stage automatically retracts all of the rear ejectors $h_1$, $h_2$, $h_3$, $h_4$ and $h_5$ to their original positions.

(iv) As clearly illustrated in FIGURE 6, the transfer slide $l$ is now shifted from left to right a distance Y equal to the pitch of the stations 1-7, thereby positioning the receiver $k_1$ containing the blank B in line with station 3.

(v) Next, swing stops $m_1$, $m_2$, $m_3$ and $m_4$ swing into their stop positions, the tips of these blades being in alignment with the collets $p_1$, $p_2$, $p_3$ and $p_4$ which are open at this stage. The front ejectors $n_1$, $n_2$, $n_3$, $n_4$ and $n_5$ are meanwhile advanced from the front towards the rear of the machine, the first ejector $n_1$ as a consequence pushing the blank B out of the receiver $k_1$ and into the open collet $p_1$ up to the operative swing stop $m_1$, all as shown in FIGURE 7.

(vi) The collets now close, the collet $p_1$ thereby firmly gripping the blank B in readiness for chamfering the 1st end thereof.

(vii) The swing stops $m_1$, $m_2$, $m_3$ and $m_4$ are thereupon returned to their inoperative positions, and the front ejectors $n_1$, $n_2$, $n_3$, $n_4$ and $n_5$ are retracted to their original positions clear of the receivers $k_1$, $k_2$, $k_3$, $s_1$ and $s_2$ (FIGURE 8).

(viii) At this stage, also depicted in FIGURE 8, the two chamfer heads $q_1$ and $q_2$ and the two screwing heads $r_1$ and $r_2$, all revolving at the appropriate cutting speeds, are first quickly advanced to their commencement of cutting positions and thereupon immediately further advanced at a controlled feed rate; as a result, the 1st end of the blank B has formed thereon a chamfer and/or dog end. Each of the four cutting spindles is arranged to contact, at the point of its maximum outward travel, a limit switch, and these limit switches are so connected in series that the work head with the longest cutting operation governs the cycle time of the machine and all four work heads are retracted together. During this first chamfering operation on the blank B, the transfer slide $l$ traverses from right to left until receiver $k_1$ is again in line with station 2 (see FIGURE 8).

(ix) The collets $p_1$, $p_2$, $p_3$ and $p_4$ open again and thus terminate one complete cycle of the machine. The cycle is, however, repeated several times to enable the blank B to continue its progressive advancement through successive stations.

(x) Thus, the rear ejectors $h_1$, $h_2$, $h_3$, $h_4$ and $h_5$ are now advanced again as a consequence of which the ejector $h_2$ returns the stud blank B, with its 1st end chamfered, into the turnable receiver $s_1$.

(xi) The transfer slide $l$ is thereupon traversed again from left to right a distance equal to the pitch of the stations so that, by virtue of the consequential co-operation of the pinion $t_1$ with the fixed toothed rack $u_1$, the receiver $s_1$ will be automatically turned through 180° and thereby positioned at the station 4—with the 2nd end of the blank B in line with the collet $p_2$ as shown in FIGURE 9.

(xii) Swing stops $m_1$, $m_2$, $m_3$, $m_4$ and $m_5$ thereupon swing into their operative positions and, with the collets open, the front ejectors $n_1$, $n_2$, $n_3$, $n_4$ and $n_5$ are advanced so that the ejector $n_2$ pushes the blank B out of the receiver $s_1$ into the collet $p_2$ up to the swing stop $m_2$.

(xiii) The collets close again, the collet $p_2$ thus firmly gripping the blank B in readiness for chamfering the 2nd end thereof.

(xiv) The swing stops $m_1$, $m_2$, $m_3$, $m_4$ and $m_5$ are thereupon returned to their inoperative positions, and the front ejectors $n_1$, $n_2$, $n_3$, $n_4$ and $n_5$ are retracted clear of the receivers.

(xv) At this juncture the chamfer heads $q_1$ and $q_2$ and the screwing heads $r_1$ and $r_2$ are advanced first quickly and then at a controlled feed rate as a result of which the 2nd end of the blank B is chamfered by the rotating chamfer head $q_2$ at the station 4. During this second chamfering operation on the blank B the transfer slide $l$ is traversed from right to left so as to enable the receiver $k_2$ fixed on the said slide to accept the blank which is now chamfered at both ends. The stage now reached is illustrated in FIGURE 10.

(xvi) The collets $p_1$, $p_2$, $p_3$ and $p_4$ open yet again to terminate the second cycle of the machine (during progression therethrough of the blank B).

(xvii) The rear ejectors are advanced again so that the ejector $h_3$ projects the chamfered blank B from the open collet $p_2$ into the receiver $k_2$.

(xviii) Next, the transfer slide $l$ is traversed again from left to right a distance equal to the aforesaid pitch so that the receiver $k_2$ is positioned in line with the first, $r_1$, of the two screwing heads at station 5 and the chamfered 2nd end of the blank B is in line with the open collet $p_3$ (FIGURE 11).

(xix) The swing stops $m_1$–$m_4$ at this stage swing again into their operative positions and the front ejectors $n_1$–$n_5$ are advanced as a result of which the ejector $n_3$ projects the blank B into the open collet $p_3$ up to the swing stop $m_3$.

(xx) The collets now close, thus causing the collet $p_3$ to firmly grip the blank B in readiness for screwing its 2nd end.

(xxi) The swing stops $m_1$–$m_5$ are returned again to their inoperative positions and the front ejectors $n_1$–$n_5$ are retracted.

(xxii) The work heads are thereupon advanced in the manner previously described so that the 2nd end of the blank B is screwthreaded by the rotating screwing head $r_1$ at station 5. During this first screwing operation upon the said blank the transfer slide is traversed from right to left so as to enable the turnable receiver $s_2$ to accept the blank which, at this stage, depicted in FIGURE 12, is chamfered at both ends and screwthreaded at one end only.

(xxiii) The collets $p_1$–$p_4$ are open again to terminate the third machine cycle.

(xxiv) The rear ejectors $h_1$–$h_5$ are next advanced so that the ejector $h_4$ pushes the blank B from the open collet $p_3$ into the receiver $s_2$.

(xxv) The transfer slide is then moved one pitch from left to right so that, as a consequence of turning of the pinion $t_2$ by the fixed toothed rack $u_2$, the receiver $s_2$, is being transferred from station 5 to station 6 will also be turned through 180° to turn the blank B end for end so that its 1st end is in line with the collet $p_4$ as shown in FIGURE 13.

(xxvi) After the swing stops have swung into their operative positions the front ejectors are yet again advanced as a consequence of which the ejector $n_4$ projects the blank B into the open collet $p_4$ up to the swing stop $m_4$.

(xxvii) The collets close again, thereby resulting in the collet $p_4$ gripping the blank B in readiness for screwing its 1st end.

(xxviii) The swing stops $m_1$–$m_4$ are returned to their inoperative positions and the front ejectors are retracted.

(xxix) The work heads are re-advanced so that the 1st end of the blank is screwthreaded by the screwing head $r_2$ at the station 6. During this second screwing operation on the blank the slide $l$ is traversed from right to left so as to enable the receiver $k_3$ to accept the now completed stud S (see FIGURE 14).

(xxx) The collets $p_1$–$p_4$ open yet again to terminate the fourth machine cycle.

(xxxi) The rear ejectors $h_1$–$h_5$ are advanced so that the ejector $h_5$ projects the finished stud from the open collet $p_4$ into the receiver $k_3$, as shown in FIGURE 14.

(xxxii) The transfer slide $l$ is moved to the extent of one pitch of the stations from left to right to position the receiver $k_3$ in alignment with a receiver $v$ adjoining an inspection gauge $w$ at station 7 as shown in FIGURE 15.

(xxxiii) Finally, the front ejectors $n_1$–$n_5$ advance as a consequence of which the ejector $n_5$ pushes the completed stud S into the receiver $v$ (FIGURE 16). The finished stud is retained in this receiver during one machine cycle during which time the threads at both ends of the stud are subjected to an automatically applied inspection gauge to check the effective diameter of the threads. The gauge may be in the form of a conventional "go" and "no-go" caliper type of thread gauge slidably mounted in such a manner that in the event of the threads being undersize or oversize, trip or limit switches are actuated to cause the machine to stop and at the same time to give an audible or visual warning signal.

When the finished stud S has passed inspection the next stud S+ in sequence serves as an ejector to push the stud S out of the receiver $v$ into a chute $x$ (FIGURE 17) by means of which the stud S is guided into a suitable container.

The automatic stud producing machine so far broadly described and purely diagrammatically illustrated in FIGURES 1–17 will now be described in a little more detail with reference to FIGURES 18, 19 and 20. As will be seen in these figures, the machine includes a hollow base structure 10 within which is housed a variable speed motor 11 and a V-belt drive 12, which, through the medium of associated chain drives 13 and 14 continuously rotates the chamfer heads $q_1$ and $q_2$ and the screwing heads $r_1$ and $r_2$ (see FIGURES 19 and 20). In this connection, the spindles of these work heads are furnished with gears 15 which, as shown more clearly in FIGURE 20, mesh with chain-driven gears 16.

The collets $p_1$–$p_4$ are stationary and interchangeable, being adapted to exercise a parallel grip upon the stud blanks B. Each of the said collets may, in fact, be in the form of a pressure liquid-operated chuck incorporating an inner lamella which is bounded by seals and over the whole of the outer surface of which liquid pressure can act to reduce the bore size of the collet and thus cause a gripping effect between a stud blank and the collet. A screwed piston turnable inwards by any suitable means, may be employed to cause liquid pressure to act in the manner required upon and around the inner lamella. It is to be clearly understood, however, that the collets may alternatively be operated pneumatically or even mechanically.

The linearly movable transfer slide $l$ is actuated by means of a lever 17 which is operated hydraulically, pneumatically or mechanically. The slide is moved to and fro, i.e. reciprocated, to an extent Y equivalent to the equally pitched axes of the work heads (see FIGURE 20).

The friction springs incorporated in the receivers $k_1$, $k_2$, $k_3$, $s_1$ and $s_2$ are like that designated 19 in FIGURE 19.

The tail end of each of the front ejectors $n_1$–$n_5$ is adjustably secured within a boss 20 formed at the upper end of a vertically disposed bracket 21 which is in turn slidably mounted upon a horizontal guide rod 22. Each bracket 21 is slid back and forth along the rod 22 by means of a corresponding lever 23, through the medium of a link 24, and all of the front ejectors are simultaneously operated by virtue of their operating levers 23 being rigidly secured upon a common rocking shaft 25. The endmost lever 23 of the series, i.e. that depicted in FIGURE 19 and located at the right-hand side of the machine (as viewed from the front) is directly coupled to the outer end of a piston rod 26 of a hydraulically operated piston and cylinder device 27. In a similar way, the tail end of each of the rear ejectors $h_1$–$h_5$ is secured within a boss 28 on a bracket 29 which is slidably mounted upon a guide rod 30. Each bracket 29 is slid back and forth along the rod 30 by means of a corresponding lever 31, through the medium of a link 32, and all of the said rear ejectors are simultaneously operated by reason of the fact that, as clearly shown in FIGURE 20, all the operating levers 31 are rigidly secured upon a common rocking shaft 33. The endmost lever 31 of the series, i.e. that designated 31' at the right-hand side of the machine (as viewed from the rear thereof as in FIGURE 20) is directly coupled to the outer end of a piston rod 34 of a hydraulically operated piston and cylinder device 35.

The two piston and cylinder devices 27 and 35 are pivotally mounted as shown in FIGURE 19. In FIGURE 18 the levers and linkages between the front and the rear ejectors and the two rocking shafts 25 and 33 are omitted in the interests of clarity.

The drive from the chain drive 13 to the two associated chain drives 14 is transmitted through two intermeshing gears 36 and 37 which are interchangeable with gears of varying sizes to provide a desired range of different speeds of rotation of the work heads.

In conjunction with each of the four hydraulically traversible work heads illustrated in FIGURES 18–20 there are provided a head traverse cylinder 38, a hydro-check ram 39 and an oil reservoir 40 equipped with a hydro-check adjuster valve 41. Each reservoir 40 keeps the corresponding hydro-check device supplied, and the purposes of such device are to enable the relevant work head to be initially quickly advanced and then slowed down, and also to be speedily retracted at the appropriate times.

In the particular machine shown in FIGURES 18–20, moreover, a hopper 42 is provided to receive the stud blanks B which are to be successively projected into the receiver $k_1$ by means of the rear ejector $h_1$. In FIGURE 18, the transfer slide $l$ is shown at the left-hand end of its travel at which the receiver $k_1$ is so positioned to receive a blank B.

Each of the pair of chamfer heads $q_1$ and $q_2$ may consist either of a single turning tool in a roller box, or a multiple turning head of any conventional form.

Each of the screwing heads $r_1$ and $r_2$ may advantageously be of the known form incorporating a self-opening mechanism, e.g. operated by means of a built-in adjustable stop, which swings open the thread rolls instantaneously when a required length of thread has been formed.

If, on the other hand, rotary thread cutting or rolling heads are employed, these again may be of any suitable known form, and similarly self-opening. In any event, die opening and closing mechanisms, associated with the illustrated heads $r_1$ and $r_2$, are indicated at 43 in FIGURE 18.

The swing stops $m_1$, $m_2$, $m_3$ and $m_4$ are suitably linked together.

All of the moving parts of the machine may be timed from a common cam shaft, the cycle timer being variable, e.g. by changing of gears such as those indicated at 36 and 37 in FIGURES 19 and 20. The machine may be adjusted to produce one completed stud in an interval of time varying anything from, say, three to twenty-four seconds although there is no limitation in this respect. Alternatively, the relevant moving parts of the machine may be so sequentially operated that the termination of one stage in the sequence of operations upon the blanks signals the commencement of the next stage.

Instead of the collets being pressure liquid operated as hereinbefore described, each of them may incorporate a multi-start screw which can exert pressure in an axial direction to reduce the bore size of the collet.

I claim:

1. An automatic stud producing machine comprising, in combination, means operable to successively feed stud blanks from a supply into the machine; a straight row of uniformly spaced work heads located at successive stations, said work heads being disposed in pairs and the two heads of each pair operating to form respectively opposite ends of fed stud blanks; drive means for continuously rotating the work heads; collets at said stations for holding stud blanks while they are being operated upon by the work heads; a transfer slide which is linearly movable to and fro parallel to and in front of the straight row of work heads; means for reciprocating the said slide over a distance equal to the pitch of the work heads and collets; receivers mounted on said transfer slide for receiving and carrying the stud blanks during progressive and linear transfer of the same from station to station; toothed pinions which are arranged to turn about their axes on the transfer slide and have appropriate ones of the aforesaid receivers mounted thereupon; toothed racks provided at fixed locations alongside the transfer slide with their teeth permanently in mesh with the said toothed pinions whereby each time the slide is moved linearly to advance stud blanks carried in said receivers one step towards the final station each of the said toothed pinions and the receivers they carry will be automatically turned through 180° and, conversely, the said pinions and receivers will be automatically restored to their original positions each time the transfer slide is moved back idly to its starting position with the receivers empty; and sets of thin and straight ejector pins arranged at respectively opposite sides of the path of movement of the transfer slide, the ejector pins of one set being operable to eject blanks from the collets into the receivers whilst the ejector pins of the other set are operable to return the blanks from such receivers into the collets.

2. An automatic stud producing machine according to claim 1, wherein each work head is advanced and retracted by an individual hydraulic traverse cylinder having associated therewith a hydraulically operated check ram supplied with oil from a reservoir equipped with an adjuster valve, said check ram being adapted to enable the relevant work head to be initially quickly advanced and then slowed down, and also to be speedily retracted at the appropriate times.

3. An automatic stud producing machine according to claim 1, wherein the ejector pins in each set are coupled together and operated by a hydraulic piston and cylinder device through the medium of levers and linkages.

4. An automatic stud producing machine according to claim 1, wherein the ejector pins extend at right angles to the transfer slide, and the said pins in each set are linked together so as to be simultaneously movable both when being projected in a forward direction and retracted.

5. An automatic stud producing machine according to claim 1, which includes a fixed receiver located at the leading end of the series of receivers to receive, after each complete reciprocation of the transfer slide, a fresh stud blank fed into the machine, and another fixed receiver at the opposite end of said receivers to receive a finished stud prior to final ejection of the latter from the machine.

6. An automatic stud producing machine according to claim 5, wherein at the side of the transfer slide at which the work heads are located, i.e. at the rear of the machine, the set of ejector pins comprises one rear ejector pin extending co-axially through each work head and an additional rear ejector pin for ejecting a stud blank fed from the supply into the said fixed receiver at the leading end of the series of receivers on the transfer slide, whilst at the opposite side of the said transfer slide, i.e. at the front of the machine, there is a set of front ejector pins equivalent in number to the said rear ejector pins but displaced laterally to the extent of the pitch of the work heads, the said set of front ejector pins including one for ejecting finished stud from the fixed receiver constituting the last of the series of receivers on the transfer slide.

7. An automatic stud producing machine according to claim 6, wherein each of the receivers on the transfer slide consists of a cylindrical holder having fitted therein a leaf spring adapted to bear lightly but frictionally upon a stud blank inserted into said holder.

References Cited by the Examiner
UNITED STATES PATENTS

| | | |
|---|---|---|
| 2,582,680 | 1/52 | Church. |
| 2,881,452 | 4/59 | Klooz _____ 10—91 |
| 2,886,836 | 5/59 | Moeltzner _____ 10—2 |
| 3,060,466 | 10/62 | Kozacka _____ 10—105 |

ANDREW R. JUHASZ, *Primary Examiner.*